J. H. PEARSON.
TIRE INFLATER.
APPLICATION FILED APR. 20, 1915.

1,165,282.

Patented Dec. 21, 1915.

Witnesses

J. H. Pearson
Inventor, by C. A. Snow & Co.
Attorneys.

UNITED STATES PATENT OFFICE.

JAMES H. PEARSON, OF INDIANAPOLIS, INDIANA, ASSIGNOR OF ONE-THIRD TO WEEDEN O. JACKSON AND ONE-THIRD TO JOHN U. BAUGHMAN.

TIRE-INFLATER.

1,165,282.  Specification of Letters Patent.  Patented Dec. 21, 1915.

Application filed April 20, 1915. Serial No. 22,605.

*To all whom it may concern:*

Be it known that I, JAMES H. PEARSON, a citizen of the United States, residing at Indianapolis, in the county of Marion and State of Indiana, have invented a new and useful Tire-Inflater, of which the following is a specification.

The device forming the subject matter of this application is adapted to be employed for pumping up a tire as the tire rotates, and the invention aims to provide novel means whereby a reciprocating movement is imparted to the pumping mechanism.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

Figure 1:
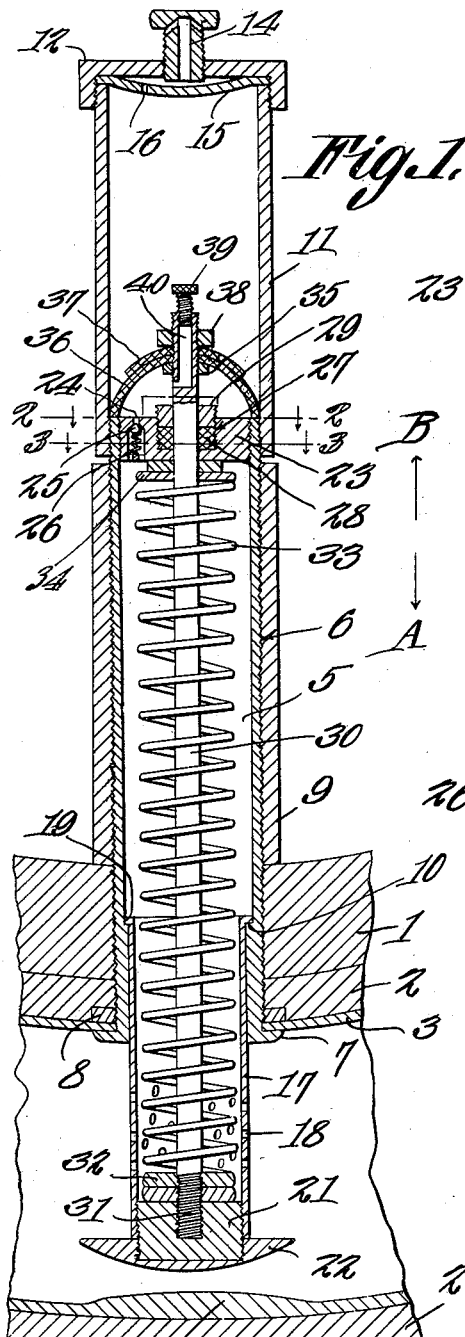
Figure 2:
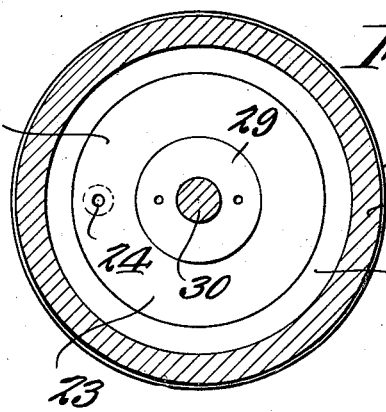
Figure 3:
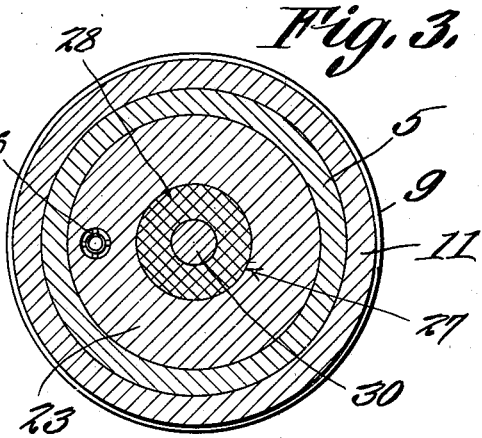
Figure 4:
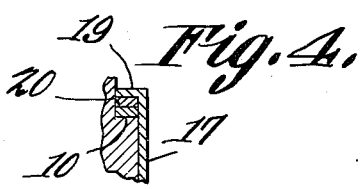

In the accompanying drawings:—Figure 1 shows the invention in longitudinal section; Fig. 2 is a cross section on the line 2—2 of Fig. 1; Fig. 3 is a cross section on the line 3—3 of Fig. 1; Fig. 4 is a fragmental longitudinal section showing certain elements which if desired may be added to the structure.

The present invention contemplates the use of a wheel rim 1 carrying a tire casing 2 inclosing, if desired, an inner tube 3, the tire, and preferably the inner tube being thickened as shown at 4 for a purpose which will be set forth hereinafter.

A tubular casing 5 passes through the rim 1 and enters the tire, the casing 5 being externally threaded as shown at 6. One end of the casing 5 is provided with a flange 7 which coöperates with the inner tube 3. A nut 8 may be threaded onto the casing 5 and coöperates with the flange 7 to grip the inner tube. A nut or sleeve 9 is threaded onto the tubular casing 5 and coacts with the rim 1 to hold the casing firmly in position. The casing 5 is provided relatively near to the rim 2 with an internal shoulder 10. Threaded onto the casing 5 and constituting to all intents and purposes a part thereof is an extension 11 and threaded onto the exposed end of the extension 11 is a cap 12 having an air inlet 14 in the form of a nipple. A diaphragm valve 15 is provided the same being resilient and being bound between the end of the extension 11 and the cap 12. In the diaphragm valve 15 is formed an opening 16 which is disposed out of alinement with the bore of the air inlet nipple 14. Mounted to reciprocate within the casing 6—11 is a plunger which is a composite structure, the same including a tube 17 entering the tire 2—3 and provided with ports 18 which communicate with the interior of the tire. The tube 17 may be provided with a shoulder 19 which limits the outward movement of the tube and, for purposes of adjustment spacers 20 may be interposed, as shown in Fig. 4, between the shoulders 19 and 10. Threaded into the end of the tube 17 is a plug 21, and threaded or otherwise secured to the plug is a foot 22 adapted to coöperate with the thickened portion 4 of the tire to impart a reciprocating movement to the plunger, as will be understood when the description is proceeded with.

Threaded or otherwise secured in that end of the casing 5 which is remote from the tire is a head 23 provided with a port 24 controlled by an outwardly closing valve 25 maintained in closed position by means of a spring 26. In the head 23 is formed a recess 27 receiving a packing 28 and threaded into the recess is a nut 29. A spindle 30, constituting a part of the plunger hereinbefore referred to reciprocates in the packing 28, the nut 29, and the head 23. One end of the spindle 30 is threaded as shown at 31 into the plug 21 and is held by lock nuts 32. A compression spring 33 abuts at one end against the lock nuts and at its other end abuts against washers 34 which coöperate with the head 23. Mounted on the spindle 30 between the head 23 and the cap 12 is a nut or abutment 35 receiving a cup-shaped piston head 36 which is resilient, the piston head 36 being restrained by a cup-shaped backing 37 which preferably is somewhat rigid, and is of less diameter than the piston head, the backing 37 being held in place by a nut 38. The spindle 30 is provided with a longitudinal passage 40 discharging laterally between the head 23 and the piston head 36, the outer end of the passage 40 being closed by a plug 39 which may be threaded into the spindle 30.

In practical operation, in order to pump up the tire in the first instance, the cap 12, the diaphragm valve 15 and the plug 39 are removed. An air hose (not shown) is assembled with the end of the spindle 30. The air then traverses the passage 40 and the port 24, the valve 25 being unseated. The air passes through the casing 5 and enters the tire by way of the ports 18 in the casing. When a sufficient air pressure has thus been created in the tire, the valve 25 will hold the pressure thus secured and the plug 39 together with the diaphragm valve 15 when the cap 12 is replaced.

When the air pressure within the tire falls, the tire compresses along its tread portion, as it comes into contact with the ground. Thus, the thickened part 4 of the tire is brought into contact with the foot 22 of the plunger, the plunger being moved in the direction of the arrow B. When the plunger moves in the direction of the arrow B, the piston head 36 creates sufficient pressure in the extension 11 to support the diaphragm valve 15 upwardly, so that the same cuts off the bore of the air inlet 14. The air thus trapped in the extension 11 flows in the direction of the arrow A past the edge of the cup-shaped piston head 36, the periphery of the piston head yeilding enough to permit this operation. When pressure is no longer exerted against the foot 22 by the thickened portion 4 of the tire, the plunger starts to move in the direction of the arrow A under the action of the spring 33. The air which is trapped between the cup-shaped piston head 36 and the head 23 will be forced through the port 24, the valve 25 unseating, and the air ultimately entering the tire through the ports 18 in the tube 17. As the plunger moves in the direction of the arrow A, the diaphragm valve 15 is drawn inwardly, thus spacing the diaphragm valve apart from the inner end of the air inlet nipple 14, whereupon the air will be sucked into the extension 11 of the casing, through the port 16 in the valve 15, as will be obvious from Fig. 1.

From the foregoing it will be observed that the device herein disclosed is so constructed that as the wheel rotates, a continuous pumping action will take place. Should the pressure created within the tire be too great, such pressure may be relieved by a simple safety valve structure of any sort, there being many devices in the art adapted for this purpose.

Having thus described the invention, what is claimed is:—

In a device of the class described, a tire; a casing discharging in the tire; a head carried by the casing; a valve in the head; a tire actuated plunger reciprocating in the head; resilient means for moving the plunger in one direction; a piston head carried by the plunger, the plunger having a passage opening at its ends upon opposite sides of the piston head, one end of the passage opening between the piston head and the head in the casing; and removable means for closing the other end of said passage.

In testimony that I claim the foregoing as my own, I have hereto affixed my signature in the presence of two witnesses.

JAMES H. PEARSON

Witnesses:
DAVID KIDD,
J. P. WILLIAMS.